Jan. 1, 1929.    V. ISACCO    1,697,009
FLYING MACHINE
Filed Aug. 29, 1927    3 Sheets-Sheet 1

Inventor:
V. Isacco,
By Langner, Parry, Card & Langner
Attys.

Jan. 1, 1929.　　　　　V. ISACCO　　　　　1,697,009
　　　　　　　　　　FLYING MACHINE
　　　　　　Filed Aug. 29, 1927　　　3 Sheets-Sheet 3

Inventor:
V. Isacco,

Patented Jan. 1, 1929.

1,697,009

UNITED STATES PATENT OFFICE.

VITTORIO ISACCO, OF PARIS, FRANCE.

FLYING MACHINE.

Application filed August 29, 1927, Serial No. 216,270, and in France August 31, 1926.

The invention relates to a flying machine derived from the helicopter type having a sustaining system constituted by a single propeller comprising a number of blades articulated to a common hub and driven by engines mounted on the blades, and a propelling system including a propeller or propellers driven by an engine or engines mounted on the fuselage to furnish the power necessary for translation; controlling means being provided for varying automatically or at the will of the pilot the pitch of the blades of the sustaining propeller.

The machine according to the present invention incorporates the same devices broadly regarded but is differentiated inter alia by an improved arrangement and grouping of the engines and by an improved arrangement for varying the pitch of the blades in order to be able to effect an appreciable economy of power and the elimination of any differential between propellers turning in opposite directions and actuated by these engines.

The improved machine is adapted to start with a practically vertical lift, even though the power of the engines mounted on the blades and driving the sustaining system is of itself insufficient to ensure sustentation at a fixed point but sufficient to ensure sustentation during horizontal translation. It is known indeed that during such translation the power necessary for sustentation diminishes considerably as the speed of translation increases. Substantially vertical starting is obtained by the utilization of the kinetic energy stored in the blades when the latter are caused to turn, the machine being at rest, at a higher speed than that of normal operation. The blades of the lifting propeller, the pitch of which may be reduced to zero, are started at this speed by the engines mounted thereon. At a given moment, by the progressive and rapid augmentation of the pitch of the blades the pilot utilizes the kinetic energy stored up to liberate the machine. Due to provision of a separate engine for translation mounted on the fuselage which is in operation at this time, translation can proceed as soon as the machine has left the ground, and the speed of translation will soon be such that the power of the engines on the blades will be sufficient to ensure sustentation. In horizontal translation the engine on the fuselage will only have to furnish the power necessary to overcome the total resistance impeding the machine. The axis of the machine will remain substantially vertical, whence will result a lifting efficiency equal to if not greater than that of existing flying machines. The speed of vertical descent may likewise be reduced by utilization of the power of the engines on the blades.

The machine according to the invention is characterized by the mounting of the engines at the tips of the blades which permits of reducing considerably the power necessary, since the point of application of the power is farther distant from the axis. The utilization of engines on all the blades has the advantage of reducing and distributing the unbalanced weight.

The pitch of the blades is controlled by ailerons.

The invention will now be described with reference to the accompanying drawing in which:—

Figure 1:
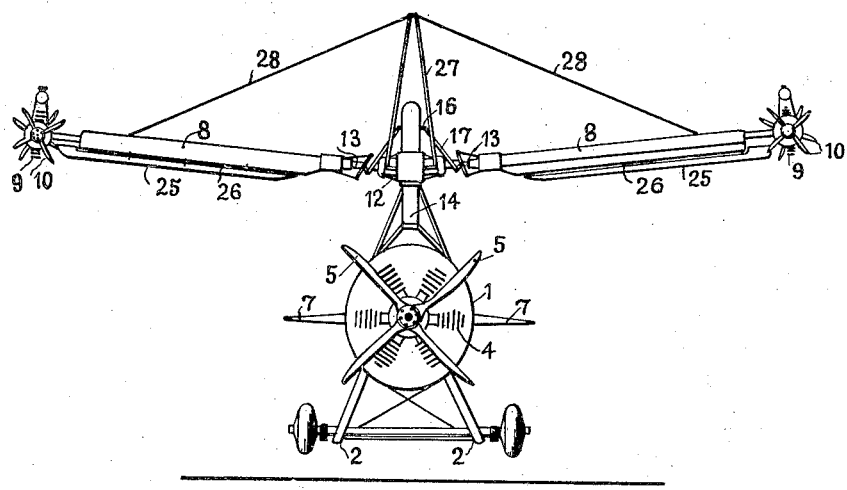
Fig. 1 is a view in front elevation of the machine after it has risen, and Fig. 2 a view in vertical section taken on the longitudinal axial plane of the machine.

In the several figures 1 denotes the fuselage, 2 the landing carriage, 3 the strut, and 4 the engine for translation with the tractor propeller 5; at 6 is shown the steering rudder and at 7 the elevator such as commonly utilized. The blades of the sustaining propeller are shown at 8. 9 denotes the engines mounted on these blades with pairs of oppositely rotatable screws.

Figure 2:
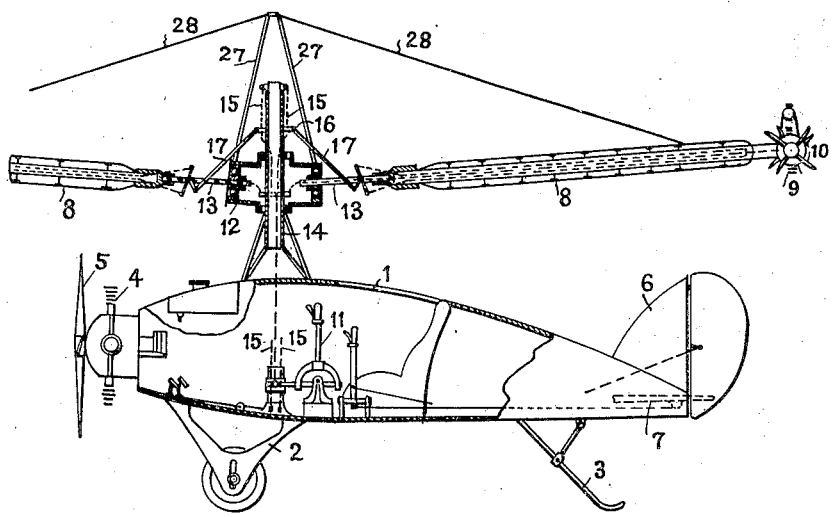
Figure 3:
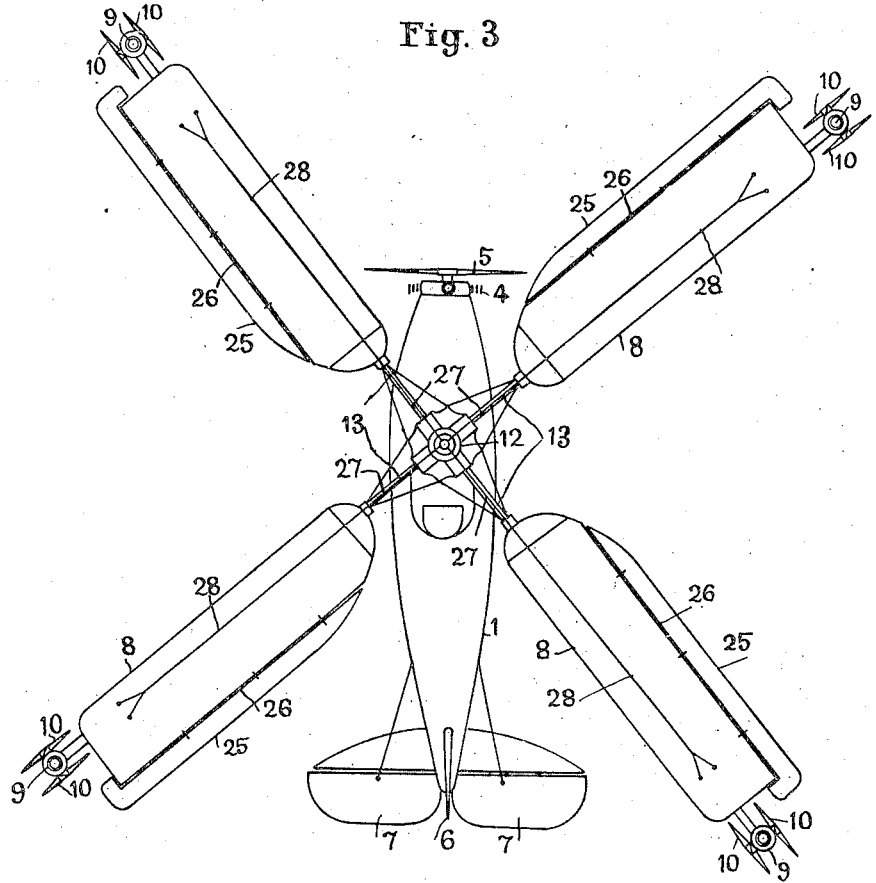
Fig. 3 is a corresponding view in plan.
Figure 4:
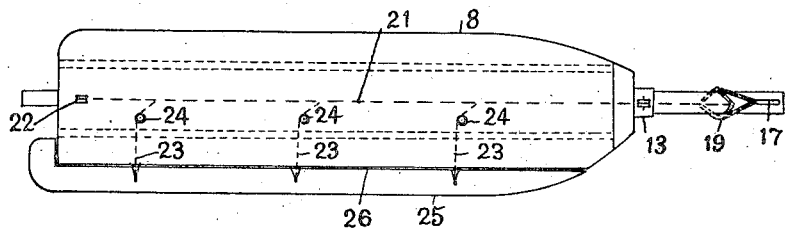
Fig. 4 shows in plan one blade with the aileron controlling means.
Figure 5:
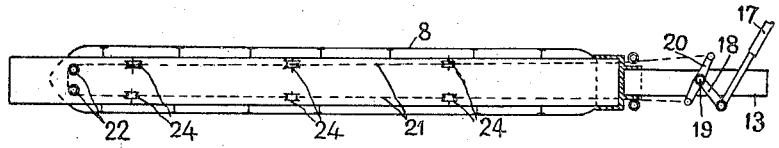
Fig. 5 is a view in longitudinal vertical section of this blade.
Figure 6:
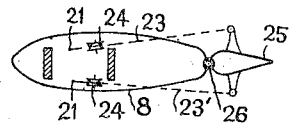
Fig. 6 is a view in transverse section.

In the fuselage is mounted as usual the lever 11 which controls the variation of the pitch of the blades 8, the latter having arms 13 universally connected to a common hub 12. This lever 11 actuates by means of cables 15 (Fig. 2) which extend through the tube 14 a ball bearing 16 to the outer race of which are fixed tubular arms 17, one for each blade 8. Each arm 17 (Figs. 4 and 5) is bifurcated to embrace the arm 13 of the relative blade, and is articulated to a crank 18 keyed on a spindle 19 so as to actuate a lever 20 also keyed on the spindle. The extremities of the lever 20 are connected to the two ends of a cable 21 extending parallel to the length of the blade 8 and looped over pulleys 22 at the outer end of said blade. Transverse cables 23 and 23' are connected, one 23 to the upper limb and the other 23' to the lower limb of the cable 21, so that when one of the cables 23 or 23' is tensioned on movement of the cable 21 the other slackens and inversely. These cables 23 and 23' led over pulleys 24 are each connected to an aileron 25 constituted like the ailerons of flying machines. Each aileron 25 is movable relatively to the blade 8 upon the joint 26; the cables 23 being attached above and the cables 23' below the joint 26.

If the ball bearing 16 rises, sliding along the tube 14, each arm 17 acts in such manner as to tension the lower limb of the cable 21 and slacken the upper limb, the result of which is to tension the cables 23' and slacken the cables 23 and to incline the aileron 25 downwards. There is thus brought about augmentation of the pitch of the blades. On the other hand, if in consequence of an extra effort the inclination of a blade above the horizontal is increased, the ball-bearing 16 remaining stationary relatively to the tube 14, the result will be that the upper limb of the cable 21 and in consequence the cables 23 will be tensioned, whence will be produced diminution of the pitch of the blades, causing the latter to offer a smaller effective surface to the wind.

The engines 9 are located at the tips of the blades on the longitudinal spars of the blades 8. The two screws 10 driven by each engine 9 are mounted one in front and the other behind the group of cylinders and turn in opposite direction in consequence of a suitable construction arranged within the interior of the engine casing.

Reservoirs for petrol and oil are mounted in known manner within the interior of the blades 8.

By means of the cables 28 the pyramid constituted by the tubes 27 supports the blades both when at rest and at the moment of landing; the connection of the cables and of the pyramid is elastic so as to ensure safety when landing, the assembly turning with the central hub 12.

Thus, the starting of the machine is effected substantially vertically by means of the engines 9 on the blades, with or without preliminary acceleration of the blades depending on the power of these engines.

Translation is effected by the engine 4 mounted on the fuselage.

The means for varying the pitch by the ailerons 25 adapts the machine for different kinds of flight and in particular to plane rotary flight, vertical or oblique, in case all the engines should break down.

As is understood, the invention is not limited to the details of construction described and illustrated as it is possible to modify the latter without departure from the spirit of the invention.

Thus, the blades, of any number, may be bi-plane, or multi-plane with or without connections between the blades. The petrol engines and their screws may be replaced by direct re-action engines. A single tractor screw with articulated vanes may be coupled to each of the engines on the blades 8 instead of two screws turning in opposite directions; likewise, there may be provided two coupled engines, the one operating a tractor screw and the other a propelling screw.

The power of the sustaining engines may be varied within wide limits depending mainly on the chief uses of the machine. The larger it is the more closely does the machine resemble the helicopter type into which it merges when the engines on the blades alone are capable of ensuring sustentation at a fixed point.

As is understood, the flexible connections which interconnect the blades 8 serve to limit their separation in accordance with their plane of rotation.

Further, the controlling means for varying the pitch of the blades is or may be contrived to maintain a given relation between the pitch of the blades and their inclination to the horizontal.

What I claim is:—

1. In a flying machine, a sustaining propeller comprising a system of blades rotatable around a substantially vertical axis, engines mounted on said blades beyond the tips thereof; and means operated by said engines for effecting rotation of said system, said engines being of low power insufficient for supporting the machine at a fixed point but sufficient to support the machine during translation of the machine.

2. In a flying machine, a sustaining propeller comprising a single system of blades articulated in all directions to a common sleeve rotatable around a substantially vertical axis with engines mounted beyond the tips of said blades, and means operated by said engine for effecting rotation of said system.

3. In a flying machine, a sustaining propeller comprising a single system of blades articulated in all directions to a common sleeve rotatable around a substantially vertical axis, engines mounted beyond the tips of said blades, and a pair of oppositely rotatable screws, one on each side of said engines to which they are operatively connected, for effecting rotation of said system.

4. In a flying machine, a sustaining propeller comprising a single system of blades articulated in all directions to a common sleeve rotatable around a substantially vertical axis, engines mounted beyond the tips of said blades, and means operated by said engines for effecting rotation of said system, said engines being of low power insufficient for supporting the machine at a fixed point but sufficient to support the machine during translation of the machine.

5. In a flying machine in combination with a sustaining propeller comprising a single system of blades articulated in all directions to a common sleeve rotatable around a substantially vertical axis, engines mounted beyond the tips of said blades, means operated by said engines for effecting rotation of said system, and ailerons jointed to and extending longitudinally of said articulated blades, and means controlled by the machine pilot for adjusting said ailerons and thereby vary the pitch of said blades.

6. In a flying machine, in combination with a sustaining propeller comprising a system of blades articulated in all directions to a common sleeve rotatable around a substantially vertical axis, engines mounted beyond the tips of said blades, and a pair of oppositely rotatable screws, one on each side of said engines to which they are operatively connected, for effecting rotation of said system, and ailerons jointed to and extending longitudinally of said articulated blades and means controlled by the machine pilot for adjusting said ailerons and thereby varying the pitch of said blades.

In testimony whereof I have signed my name to this specification.

VITTORIO ISACCO.